(No Model.)
C. C. TRAPP.
REVOLVING CHAIR.
No. 543,361. Patented July 23, 1895.
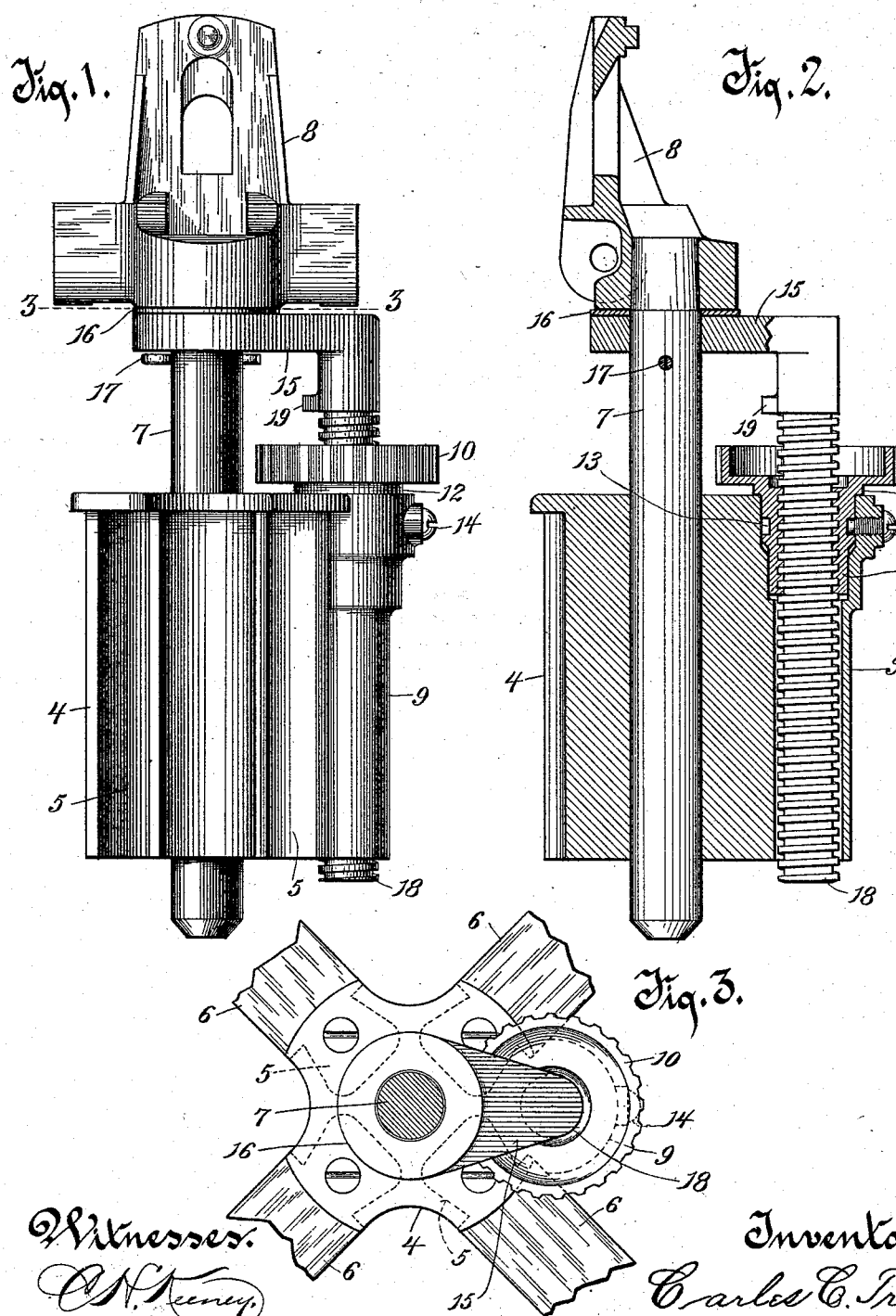

UNITED STATES PATENT OFFICE.

CARLES C. TRAPP, OF PORT WASHINGTON, WISCONSIN.

REVOLVING CHAIR.

SPECIFICATION forming part of Letters Patent No. 543,361, dated July 23, 1895.

Application filed January 18, 1895. Serial No. 535,367. (No model.)

*To all whom it may concern:*

Be it known that I, CARLES C. TRAPP, of Port Washington, in the county of Ozaukee and State of Wisconsin, have invented a new and useful Improvement in Revolving Chairs, of which the following is a description, reference being had to the accompanying drawings, which are a part of this specification.

My invention has relation to improvements in revolving chairs, having particular reference to that class of revolving chairs wherein the seat is permitted to revolve without raising or lowering it with respect to the legs, the adjustment up and down being secured by independent mechanism.

The object is to provide an improved construction of the adjusting mechanism, as will hereinafter more fully appear.

The invention consists of certain improvements upon the Letters Patent of the United States issued to me under date of March 25, 1890, and numbered 424,083, wherein a screw separate from the spindle is shown and described, said screw adapted to be moved vertically to raise and lower the chair-seat, while the depending spindle of the chair-seat bracket passes loosely and revolubly through an arm extending from the spindle.

In the drawings, Figure 1 is an elevation of my improved device. Fig. 2 is a central vertical section of Fig. 1, and Fig. 3 is a horizontal section on the line 3 3 of Fig. 1.

Like numerals of reference denote like parts throughout the several views.

In the accompanying drawings, the numeral 4 indicates a metal head provided with the usual sockets 5, which are adapted to receive therein the upper extremities of the legs 6, on which it is permanently and rigidly supported. The metal head is provided with a central vertical main aperture in which a cylindrical spindle 7 is fitted and moves freely. A bracket 8, adapted to support the chair-seat thereon, is fixed rigidly on the top of the spindle. The head 4, between two of the sockets 5, is formed with an apertured enlargement 9. The upper end of this aperture is enlarged, as clearly shown.

The numeral 10 indicates a milled nut which is provided with a depending tubular stem 11. The upper end of the stem is provided with an annular shoulder 12, which is adapted to rest upon the metal of the head and thereby not only act in the nature of a washer, but at the same time afford a firm support for the nut. As the entire weight of other parts of the chair, as well as of the occupant of the chair, is required to be sustained by this nut, the importance of having a firm bearing can therefore be readily appreciated. All that portion of the stem below the shoulder is adapted to fit in the enlarged upper end of the tube 9. A screw 14 is passed through the wall of the tubular enlargement and enters an annular recess 13 in the stem. The tubular stem of the nut is of course interiorly threaded, the threads engaging the threads of a screw 18, said screw passing through the stem and through the tubular enlargement. The upper end of the screw has projecting at right angles therefrom an arm 15, said arm having an aperture at its end through which the spindle passes and in which it rotates freely. Between this arm and the end of the bracket 8 a washer 16 is placed, said washer being preferably of steel. A split pin 17 is passed transversely through an aperture in the spindle below the arm 15 and serves to limit the upward movement of the spindle.

The screw is provided with a projecting stop 19, which is adapted to contact with the nut before the spindle has been moved downwardly a sufficient distance by the arm of the screw to permit the intersecting pin to contact with the head of the nut. By this arrangement the intersecting pin is prevented from striking the nut and interfering with the turning thereof. While I have shown and described this stop as projecting from the screw it is obvious that it can extend downwardly from the arm 15 and effect the same function.

It is evident that in order to elevate or lower the seat the nut is turned, whereby the screw 14 is raised or lowered vertically in the tubular enlargement, thereby, through the arm 15, carrying the bracket 8, with its superimposed structure, up or down, as desired. In my former patent, hereinbefore referred to, the nut was located in a recess in the metal of the head. Experience has proven that this construction is open to objections, principally the difficulty attendant upon detaching the parts, it being necessary in order to remove the screw to entirely unscrew the same from the nut. In the improved construction all that is necessary is simply to remove screw 14, when the screw 18 and nut thereon can be readily removed together from the head. Again, the disposition of the nut in a recess places it in a very inconvenient position for turning, as only part of the nut projects so as to be grasped by the fingers, and, furthermore, very little room is afforded for such finger-grasp, as the recess lies between two of the chair-legs. In the present improvements these objections are overcome in a simple manner. The head of the screw, as will be seen, is disposed above the metal head 4 in position to be readily turned.

Having thus described my invention, what I claim, and desire to secure by Letters Patent, is—

1. In a revolving chair, the combination, of a head having a main vertical aperture and an adjacent vertical auxiliary aperture, said auxiliary aperture being enlarged at and near the top of the head, a non-revoluble screw loose in the auxiliary aperture, said screw having a radially projecting arm, a nut turning on the screw and provided with a depending tubular stem fitted loosely in the enlarged portion of the auxiliary aperture, and also with a shoulder resting on the head, thereby supporting the screw and its load, a vertically-disposed spindle inserted loosely in the aperture of the head, and through the radial arm of the screw, on which arm the spindle is supported revolubly, and means securing the nut revolubly and releasably in the head, said means and construction being such that on releasing the nut, said nut, the screw and the spindle together can be lifted freely from the head, substantially as set forth.

2. In a revolving chair, the combination, of a head, a spindle arranged to move freely in an aperture therein, a screw entering a socket in the head, the end of said screw provided with an arm through which the spindle passes loosely, a nut engaging the screw above the head a pin intersecting said spindle below the arm, a projecting stop moving with the screw and adapted to contact with the nut after the spindle has been moved downwardly a certain distance to prevent the intersecting pin from striking the nut, and means for preventing vertical movement of the nut on the screw, substantially as set forth.

In testimony whereof I affix my signature in presence of two witnesses.

CARLES C. TRAPP.

Witnesses:
M. A. HANSON,
JOHN H. JACQUE.